United States Patent
Rice et al.

(10) Patent No.: US 11,863,598 B2
(45) Date of Patent: Jan. 2, 2024

(54) NETWORK-BASED COMMUNICATION TECHNIQUES USING ENHANCED COMMUNICATION PROTOCOL

(71) Applicant: InterMetro Communications, Inc., Simi Valley, CA (US)

(72) Inventors: Charles Rice, Simi Valley, CA (US); Christopher Fogel, Simi Valley, CA (US)

(73) Assignee: InterMetro Communications, Inc., Simi Valley, CA (US)

( * ) Notice: Subject to any disclaimer, the term of this patent is extended or adjusted under 35 U.S.C. 154(b) by 6 days.

(21) Appl. No.: 17/452,737

(22) Filed: Oct. 28, 2021

(65) Prior Publication Data

US 2022/0141258 A1    May 5, 2022

Related U.S. Application Data

(60) Provisional application No. 63/107,284, filed on Oct. 29, 2020.

(51) Int. Cl.
| | |
|---|---|
| *H04L 65/1073* | (2022.01) |
| *H04L 65/1104* | (2022.01) |
| *H04L 45/74* | (2022.01) |
| *H04L 67/14* | (2022.01) |

(Continued)

(52) U.S. Cl.
CPC ...... *H04L 65/1104* (2022.05); *H04L 65/1073* (2013.01); *H04L 65/65* (2022.05); *H04L 65/75* (2022.05)

(58) Field of Classification Search
None
See application file for complete search history.

(56) References Cited

U.S. PATENT DOCUMENTS

| | | | |
|---|---|---|---|
| 9,295,089 B2* | 3/2016 | Chitrapu | H04W 36/08 |
| 10,819,755 B1* | 10/2020 | Asveren | H04L 65/1045 |
| 10,841,344 B1* | 11/2020 | Asveren | H04L 65/1076 |

(Continued)

FOREIGN PATENT DOCUMENTS

WO    WO 2005/069674 A1    7/2005

OTHER PUBLICATIONS

International Search Report and Written Opinion for International Application No. PCT/US2021/072095 dated Jan. 24, 2022 in 28 pages.

*Primary Examiner* — Duc T Duong
(74) *Attorney, Agent, or Firm* — Knobbe, Martens, Olson & Bear, LLP

(57) ABSTRACT

Systems and methods for network-based communication techniques using an enhanced communication protocol. An example method includes receiving, from a first user device, a registration message comprising a plurality of communication paths over which the first user device is accessible, the communications paths indicating respective IP address/port pairs associated with the first user device, wherein information in the registration message is provided according to the session initiation protocol (SIP); setting a particular communication path as the preferred communication path for the first user device; and establishing a SIP connection between the first user device and the second user device, wherein SIP messages are routed from the second user device to the first user device via the particular communication path.

19 Claims, 11 Drawing Sheets

(51) Int. Cl.
*H04L 65/65* (2022.01)
*H04L 65/75* (2022.01)

(56) References Cited

U.S. PATENT DOCUMENTS

| | | | |
|---|---|---|---|
| 2007/0230409 A1* | 10/2007 | Semper | H04W 92/02 |
| | | | 370/338 |
| 2013/0054762 A1* | 2/2013 | Asveren | H04L 61/2553 |
| | | | 709/220 |
| 2015/0156702 A1 | 6/2015 | Stojanovski et al. | |
| 2015/0373634 A1 | 12/2015 | Periyalwar et al. | |
| 2016/0366189 A1* | 12/2016 | Hart | H04L 43/0811 |
| 2017/0180484 A1* | 6/2017 | Asveren | H04L 61/2514 |
| 2019/0052711 A1* | 2/2019 | Kharlanau | H04L 67/1061 |
| 2021/0377705 A1* | 12/2021 | Zhang | H04L 69/324 |

* cited by examiner

NETWORK-BASED COMMUNICATION TECHNIQUES USING ENHANCED COMMUNICATION PROTOCOL

RELATED APPLICATIONS

This application claims priority to U.S. Prov. Patent App. No. 63/107,284 titled "NETWORK-BASED COMMUNICATION TECHNIQUES USING ENHANCED COMMUNICATION PROTOCOL" and filed on Oct. 29, 2020, the disclosure of which is hereby incorporated herein by reference in its entirety.

This application incorporates the following disclosures herein in their entireties: U.S. patent application Ser. No. 16/869,431 filed on May 7, 2020 and titled "MULTIPLE ACTIVE NETWORK WIRELESS DEVICE USING A SHADOW NUMBER"; U.S. Pat. No. 9,124,957 filed on Feb. 6, 2012 and titled "SYSTEM AND METHOD FOR DYNAMIC MULTIFACTOR ROUTING"; U.S. Pat. No. 10,506,666 filed on Apr. 30, 2019 and titled "MULTIPLE ACTIVE NETWORK WIRELESS DEVICE."

TECHNICAL FIELD

The present disclosure relates to systems and techniques for network-based communications. More specifically, this disclosure relates to improved communication protocols usable to implement enhanced network-based communications.

BACKGROUND

Network protocols can be used to connect devices for mobile communications. One way of connecting devices is using the Global System for Mobile Communications (GSM) architecture and/or standard, which may employ time-division multiple-access (TDMA) protocols. Voice from one device can be transformed into digital data and given a channel and a time slot. The receiving device can listen to the voice during the assigned time slot. Some network protocols that compete with GSM implement Code-Division Multiple Access (CDMA), which can connect calls using a code division system. Call data may be encoded with a unique key and multiple call data may be transmitted at once. The receiving device may use the unique key to identify the data associated with the specific call to which the receiving device is connected.

SUMMARY OF CERTAIN EMBODIMENTS

In some embodiments, a system is described. The system includes a memory configured to store computer-executable instructions, and a hardware processor in communication with the memory and configured to execute the specific computer-executable instructions to perform operations comprising: receiving, from a first user device, a registration message comprising a plurality of communication paths over which the first user device is accessible, the plurality of communication paths indicating respective IP address/port pairs associated with the first user device, wherein information in the registration message is provided according to a particular control protocol; setting a particular communication path as the preferred communication path for the first user device; and establishing a connection between the first user device and the second user device according to the particular control protocol, wherein messages are routed to the first user device via the particular communication path.

The above embodiments may include one or more of the following. The registration message includes a first media channel and a second media channel, and wherein the second media channel includes information indicative of a subset of the plurality of communication paths. The first media channel is configured to include a media stream payload. The particular control protocol is the session initiation protocol (SIP), and wherein the registration message includes a header associated with identifying information according to SIP, wherein information indicative of a first communication path of the plurality of communication paths is associated with the header, and wherein information indicative of remaining of the communication paths is appended to the registration message. The particular control protocol is the session initiation protocol (SIP), wherein the registration message includes a header associated with identifying information according to SIP, wherein information indicative of a first communication path of the plurality of communication paths is associated with the header, and wherein information indicative of a second communication path of the plurality of communication paths is associated with a different header. The different header is identifiable as corresponding to a particular character string. Each communication path of the plurality of communication paths is associated with a respective cellular network, and wherein the particular communication path is set based on determining respective signal strengths associated with the cellular networks. The first user device identifies the particular communication path as being the preferred communication path. Each port indicated by a communication path is configured to be left open, such that the port is configured to transmit and/or receive information. The particular control protocol is the session initiation protocol (SIP), wherein the messages are SIP messages and the connection is a SIP connection, and wherein the operations further comprise: receiving, from the first user device, a switch message indicating that the first user device is not accessible via the particular communication path; and routing SIP messages to the first user device over a different communication path of the plurality of communication paths, such that the SIP connection is maintained. The switch message is received via the different communication path. The operations further comprise: receiving, from the first user device, a switch message indicating that the first user device is to lose access to the particular communication path; and routing SIP messages to the first user device over a different communication path of the plurality of communication paths, such that the SIP connection is maintained. The switch message is received via the particular communication path or the different communication path. Each communication path is associated with a respective cellular network, and wherein the first user device is determined to be navigating to a location at which a cellular network associated with the particular communication path is below a threshold. The dynamic routing system is configured to assign a respective port of the dynamic routing system to each of the plurality of communication paths.

In some embodiments, a method is described. The method is implemented by a dynamic routing system of one or more computers, wherein the method comprises: receiving, from a first user device, a registration message comprising a plurality of communication paths over which the first user device is accessible, the plurality of communication paths indicating respective IP address/port pairs associated with the first user device, wherein information in the registration message is provided according to the session initiation protocol (SIP); setting a particular communication path as the preferred communication path for the first user device; and establishing a SIP connection between the first user device and the second user device, wherein SIP messages are routed to the first user device via the particular communication path.

The above embodiments may include one or more of the following. The registration message includes a first media channel and a second media channel, and wherein the second media channel includes information indicative of a subset of the plurality of communication paths. The first media channel is configured to include a media stream payload. The registration message includes a header associated with identifying information according to the SIP, wherein information indicative of a first communication path of the plurality of communication paths is associated with the header, and wherein information indicative of remaining of the communication paths is appended to the registration message. The registration message includes a header associated with identifying information according to SIP, wherein information indicative of a first communication path of the plurality of communication paths is associated with the header, and wherein information indicative of a second communication path remaining of the plurality of communication paths is associated with a different header. The different header is identifiable as corresponding to a particular character string. Each communication path of the plurality of communication paths is associated with a respective cellular network, and wherein the particular communication path is set based on determining respective signal strengths associated with the cellular networks. The first user device identifies the particular communication path as being the preferred communication path. Each port indicated by a communication path is configured to be left open, such that the port is configured to transmit and/or receive information. The method further comprises receiving, from the first user device, a switch message indicating that the first user device is not accessible via the particular communication path; and routing SIP messages to the first user device over a different communication path of the plurality of communication paths, such that the SIP connection is maintained. The switch message is received via the different communication path. The method further comprises receiving, from the first user device, a switch message indicating that the first user device is to lose access to the particular communication path; and outing SIP messages to the first user device over a different communication path of the plurality of communication paths, such that the SIP connection is maintained. The switch message is received via the particular communication path or the different communication path. Each communication path is associated with a respective cellular network, and wherein the first user device is determined to be navigating to a location at which a cellular network associated with the particular communication path is below a threshold. The dynamic routing system is configured to assign a respective port of the dynamic routing system to each of the plurality of communication paths.

In some embodiments, a dynamic routing system is described. The dynamic routing system includes a memory configured to store computer-executable instructions, and a hardware processor in communication with the memory and configured to execute the specific computer-executable instructions to perform operations comprising: receiving, from a first endpoint, a registration message comprising a plurality of communication paths over which the first user device is accessible, the plurality of communication paths indicating respective IP address/port pairs associated with the first endpoint, wherein information in the registration message is provided according to the session initiation protocol (SIP); establishing a SIP connection between the first endpoint and a second endpoint; and receiving SIP messages from the first endpoint via the plurality of communication paths, wherein the dynamic routing system is configured to transmit one or more of the SIP messages to the second endpoint.

The above embodiments may include one or more of the following. The first endpoint is an Internet Protocol phone. The registration message includes a first media channel and a second media channel, and wherein the second media channel includes information indicative of a subset of the plurality of communication paths. SIP messages are transmitted from the first endpoint via the dynamic routing system to the second endpoint, and wherein the SIP messages comprise a media channel which includes call information. A first of the SIP messages is transmitted by the first endpoint simultaneously on each of the plurality of communication paths. A plurality of copies of a first of the SIP messages are received via the plurality of communication paths, wherein each copy is received at a different time. A first received copy is transmitted to the second endpoint, and wherein later received copies are discarded. The operations further comprise: receiving information indicating that a particular communication path has been severed; and receiving SIP messages from the first endpoint via remaining of the plurality communication paths, such that the SIP connection is maintained.

In some embodiments, a method is described. The method includes receiving, from a first endpoint, a registration message comprising a plurality of communication paths over which the first user device is accessible, the plurality of communication paths indicating respective IP address/port pairs associated with the first endpoint, wherein information in the registration message is provided according to the session initiation protocol (SIP); establishing a SIP connection between the first endpoint and a second endpoint; and receiving SIP messages from the first endpoint via the plurality of communication paths, wherein the dynamic routing system is configured to transmit one or more of the SIP messages to the second endpoint.

The above embodiments may include one or more of the following. The first endpoint is a Voice over Internet Protocol phone. The registration message includes a first media channel and a second media channel, and wherein the second media channel includes information indicative of a subset of the plurality of communication paths. SIP messages are transmitted from the first endpoint via the dynamic routing system to the second endpoint, and wherein the SIP messages comprise a media channel which includes call information. A first of the SIP messages of transmitted by the first endpoint simultaneously on each of the plurality of communication paths. A plurality of copies of a first of the SIP messages are received via the plurality of communication paths, wherein each copy is received at a different time. A first received copy is transmitted to the second endpoint, and wherein later received copies are discarded. The method further comprises receiving information indicating that a particular communication path has been severed; and receiving SIP messages from the first endpoint via remaining of the communication paths, such that the SIP connection is maintained.

The systems, methods and devices of this disclosure each have several innovative aspects, no single one of which is solely responsible for all of the desirable attributes disclosed herein. Details of one or more implementations of the subject matter described in this specification are set forth in the accompanying drawings and the description below.

Although certain embodiments and examples are disclosed herein, inventive subject matter extends beyond the examples in the specifically disclosed embodiments to other alternative embodiments and/or uses, and to modifications and equivalents thereof.

The details, including optional details, of one or more embodiments of the subject matter of this specification are set forth in the accompanying drawings and the description below. Other optional features, aspects, and advantages of the subject matter will become apparent from the description, the drawings, and the claims.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

Like reference numbers and designations in the various drawings indicate like elements.

DETAILED DESCRIPTION

Overview

Figure 1:
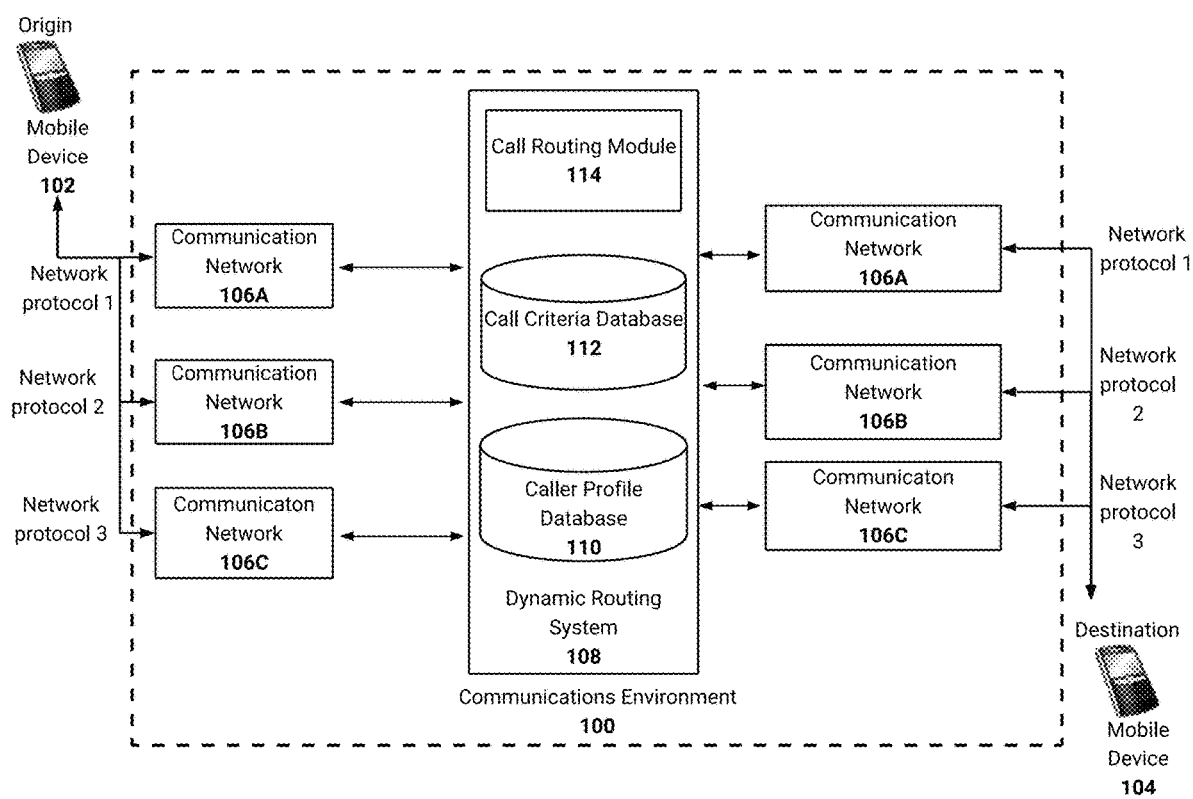
FIG. 1 illustrates an embodiment of a communications environment in accordance with the teachings of the present disclosure.

This specification describes, among other things, technical improvements with respect to example protocols usable to route information between endpoints of respective users. Example endpoints may include mobile devices, wearable devices, tablets, laptops, phones (e.g., IP phones), and so on. An example protocol, such as a control protocol, described herein is the Session Initiation Protocol (herein referred to as 'SIP'), which may be used for real-time communications sessions that include voice, video and/or messaging applications. For example, SIP is an application-layer protocol which may establish and maintain a voice call between respective users of a first endpoint and a second endpoint. In this example, the voice call may be placed over voice over IP (VoIP) or voice over LTE (VoLTE). Messages that include call information, such as the voices of the users, may be routed via a single communication path between the first endpoint and second endpoint. This single path may represent a single communication channel over which the first endpoint may transmit, or receive, the messages. As may be appreciated, if this single communication channel fails or is otherwise interrupted, the voice call will similarly fail or be otherwise negatively impacted.

As will be described, the example protocol may be enhanced to allow for multiple paths to be accessible to between the first endpoint. For example, a SIP stack used to encode and decode SIP messages may be adjusted according to the techniques described herein. With respect to the example above, if a first communication path fails, the first endpoint may maintain the same voice call in real-time and transmit, and receive, messages via a second communication path. For example, upon detecting that the first communication path has failed or is going to fail, the first endpoint may update to transmit, and receive, messages via the second communication path.

Furthermore, in some embodiments the first endpoint may transmit messages via a multitude of communications paths. In this way, if a subset of the communication paths fail, the first endpoint may maintain a voice call in real-time via the remaining communication paths.

Advantageously, the benefits described above may be implemented in the example protocol while maintaining backward-compatibility with all endpoints which use the protocol. For example, the example protocol may be adjusted such that endpoints which use the un-adjusted protocol may ignore any additional information included in messages. While the description hereinafter refers to SIP, it may be appreciated that other communication protocols may leverage the techniques described herein and fall within the scope of the disclosure.

As is known in the art, SIP is a signaling protocol (also referred to herein as a control protocol) which is usable to initiate, maintain, and terminate real-time sessions which include voice, video, messaging, and so on. Via this signaling protocol, a first endpoint may signal a request for engaging in real-time communications with a second endpoint. Once the request is acknowledged, the first endpoint and second endpoint may transmit SIP messages which include media stream payloads. These media stream payloads may include voice, video, and so on. The SIP messages may employ protocols to package the media stream payloads, such as the Real-time Transport Protocol (RTP) and Secure Real-time Transport Protocol (SRTP).

To implement SIP, commonly an endpoint will be in communication with a computing system or server associated with establishing communications. For example, the computing system or server may be a proxy server. In this example, the proxy server may route a request from the endpoint to a second endpoint. The proxy server may also route the request to another proxy server or system which is closer to, or in communication with, the second endpoint. Additionally, the endpoint may be in communication with one or more computing systems or servers associated with SIP trunking. This may allow the endpoint's private branch exchange (PBX) phone system to send and receive calls via a network (e.g., the internet).

When implementing real-time communications between two endpoints, a first endpoint may transmit an invite SIP message to the computing system or server described above. This invite SIP message may include information identifying the first endpoint, such as an internet protocol (IP) address and/or port at which the first endpoint is available. The message may also include information indicative of a second endpoint which is to be contacted. For example, the information may include an IP address, a contact name, and so on. In this example, the computing system or server may route the message to the second endpoint. Upon receipt, a negotiation process may be implemented. If a user of the second endpoint acknowledges the placed communication, an acknowledgment response (e.g., an OK SIP message) may be transmitted. The first endpoint and second endpoint may then transmit and receive SIP messages comprising media stream payloads as described above.

In the above-described implementation, SIP may therefore only have access to an IP address and port at which the first endpoint is available. Indeed, SIP may be characterized as implementing a single communication path from the first endpoint and the computing system or server. As may be appreciated by those skilled in the art, SIP messages (e.g., RFC 3261 messages) may merely identify singular identifying information associated with the first endpoint. Thus, SIP messages may be routed to the first endpoint based on this singular identifying information.

With respect to the example above, a communication path between the first endpoint and the computing system or server may be interrupted. This may result in the severing of the real-time communications between the first endpoint and the second endpoint. Since the SIP messages are only aware of the single path, any interruption of that path may result in failure of the communications.

As an example, the first endpoint may represent a phone (e.g., an IP phone) which is located in an office building. The phone may be used to place a call to a second phone using SIP. As described above, the phone may be associated with an IP address and port. Thus, and with respect to the call being placed, this IP address and port may be included in SIP messages which are usable to establish, and implement, communications with the second phone. While the office building's network may commonly function correctly, it may also get interrupted. For example, other employees at the office building may use substantial bandwidth downloading large files. In this example, SIP messages may be lost or placed into queues which cause them to not be properly transmitted. As another example, a communication path between the first endpoint and a computing system or server which is used, at least in part, to implement the call may be disrupted. For example, the first endpoint may be configured to communicate with a SIP trunk server, gateway, proxy, and so on. In this example, communications with these systems may be disrupted or the systems may experience downtime.

In the examples described above, the first endpoint's call with the second endpoint would fail. As an example, the first endpoint would be unreachable at the IP address and port which is included in the SIP messages. The first endpoint would then be required to reestablish the call with the second endpoint. For example, if the network went down the first endpoint may need to obtain a new IP address. As another example, the first endpoint may need to communicate with a different SIP trunk server, gateway, proxy, and so on. This repairing process may take several minutes to allow for the first endpoint to register with the different SIP trunk server, gateway, proxy, and so on.

Advantageously, the techniques described herein may allow for the first endpoint may to seamlessly maintain communications with the second endpoint. For example, the first endpoint may cause a switch to a different IP address and port at which the first endpoint is available. As another example, the first endpoint may receive, and transmit, SIP messages via multiple IP addresses and ports. Thus, if one IP address and port is inaccessible, the SIP messages may still be received and transmitted by remaining IP addresses and ports.

As described in more detail below, these additional communication paths may be effectuated while maintaining backwards compatibility with SIP. For example, additional information may be included in SIP messages which allows for these additional communication paths. Certain endpoints and associated computing systems or servers may leverage this additional information. Other endpoints and associated computing systems or servers, which do not implement the techniques described herein, may ignore this additional information during normal course of operation. For example, the additional information may be provided with identifying information (e.g., message headers) which are separate from those used to perform known SIP functionality.

An example computing system or server described herein, the dynamic routing system 108, may leverage this additional information to enhance SIP. The dynamic routing system 108 (e.g., the Metroswitch Gateway from MetroSwitch Technologies™) may be in communication with a multitude of endpoints. Additionally, the dynamic routing system 108 may route calls placed by the endpoints to one or more communication networks. Each endpoint may provide registration information, such as via SIP message(s), to the dynamic routing system 108. The registration information may indicate an IP address and port at which the endpoint may be accessible. This information may be included in a standardized portion of the SIP messages (e.g., the user-agent header). Furthermore, the registration information may indicate one or more other IP addresses and ports at which the endpoint is accessible. The dynamic routing system 108 may store this registration information, such that it stores multiple IP address/port pairs at which the endpoint is accessible.

The dynamic routing system 108 may additionally maintain communications paths for each of the IP address/port pairs. For example, each IP address/port pair associated with an endpoint may be in communication with a respective IP address/port pair of the dynamic routing system 108. As an example, the endpoint may transmit, and optionally receive, SIP messages over each of the IP address/port pairs.

A mobile device may provide registration information in a SIP message which indicates (1) an IP address/port pair with a first cellular network and (2) an IP address/port pair with a second cellular network. In some embodiments, the mobile device may provide the registration information in more than one SIP message. In this example, the dynamic routing system 108 may route communications over the first cell network and/or the second cellular network. In this way, if the mobile device loses, or is going to lose, connection to the first cellular network, a call may be routed in real-time over the second cellular network.

The techniques described herein therefore provide enhancements to communication protocols. Via these enhancements, the communication protocols may substantially limit communications being lost or dropped. For example, SIP may be enhanced to allow for multiple communication paths to be maintained in a same SIP connection (e.g., a same voice call, video call, and so on).

While SIP is described herein, as may be appreciated SIP is an example of a signaling or control protocol and other signaling or control protocols may benefit from, or otherwise utilize or leverage, the techniques described herein. For example, vehicles (e.g., autonomous vehicles) may communicate with a back-end system or server via cellular or wireless connections using a custom or proprietary protocol. In this example, the vehicles may establish multiple communication paths at which they may receive, or provide, information. For example, the vehicles may include multiple SIM cards. The vehicles may therefore rapidly adjust which communication path is active such that they can be better ensure they maintain communications with the back-end system or server or with other vehicles. Similarly, unmanned aerial vehicles (e.g., drones) or other unmanned vehicles may communicate using the techniques described herein.

Example signaling or control protocols which may be enhanced to allow for seamless adjustment to a communication path include, 802.11p, 3GPP, and other Vehicle-to-everything (e.g., V2X) protocols. Existing standardized, or proprietary, protocols may thus be enhanced via the techniques described herein. For example, a header used by an example signal or control protocol may be adjusted to include information identifying multiple communication paths at which a device or system (e.g., a drone, a vehicle) may be reached. Similar to the description below, a change message may be provided by the device using the example signaling or control protocol to identify that a particular communication path (e.g., a preferred communication path) is to be selected.

Example Block Diagram

FIG. 1 illustrates an embodiment of a communications environment 100 in accordance with the present disclosure. In the communications environment 100, a mobile device 102 can make a call to a mobile device 104. In the illustrated example, the mobile device 102 may be associated with a user who is initiating a call and may be referred to as the origin of the call. Mobile device 104 may be associated with a user who the caller desires to call and may be referred to as the target or destination for the call. However, it should be understood that the roles of the users, and consequently the roles of the mobile devices 102 and 104 may be reversed. The call is not limited in type and can include any type of call that may be performed over one or more communication networks that may implement one or more different communication protocols. For example, the call can be: a telephone call placed via mobile phone, a Voice over Internet Protocol (VoIP) call, or a modem call, to name a few. Further, the mobile device 102 and the mobile device 104 can include any user or organization capable of placing the call.

To establish the call connection between the mobile device 102 and the mobile device 104, the call may be routed over one or more different communication networks provided or maintained by one or more communication network providers. In some cases, each communication network may be owned or maintained by a different communication network provider. However, in some embodiments, multiple communication networks may be maintained by a single communication network provider. For example, a provider may maintain a 3G and 4G network. Further, the provider may be implementing a 5G network. Each of the 3G, 4G, or 5G networks may implement versions of the same communication profile or may implement different communication profiles.

In one embodiment, the call is routed to a dynamic routing system 108 (e.g., a system of one or more computers). The dynamic routing system 108 can determine one or more network protocols that are supported by a network 106 of a communications network provider. The communications environment illustrated three communication networks 106A, 106B, 106C, which may individually be referred to as a communication network 106 or collectively referred to as communication networks 106. For example, the dynamic routing system 108 may determine that a communication network 106A can implement a network protocol 1, a communications network 106B can implement a network protocol 2, and a communication network 106C can implement a network protocol 3. In some embodiments, the communication network 106A and 106C may both implement the network protocol 1 but use different frequency spectrums or bands.

The dynamic routing system 108 can be associated with one or more of the communication network providers or with any entity that can offer systems or services for facilitating optimal or improved routing over one or more of the communication networks based on one or more routing criteria. For example, the dynamic routing system 108 may be configured to provide optimal or improved routing based on a criteria of improving call signal strength for calls or reducing dropped call rates for calls. Further, each communication network 106 can include a number of computing devices and/or telephony devices, such as session border controls and gateways, to facilitate communications within the communication network 106, between a plurality of communication networks 106, and/or with the dynamic routing system 108. Some non-limiting examples of these computing devices are illustrated in FIG. 1 with respect to the dynamic routing system 108 and are described in more detail below.

Although FIG. 1 illustrates a particular embodiment of a configuration of the communications environment 100, other configurations are possible. For example, other embodiments of the communications environment 100 may enable routing of calls directly to the dynamic routing system 108 prior to the calls being routed to a communication network 106. In some embodiments, the communications networks 106 can communicate directly with other communication networks.

In certain embodiments, when routing a call, the dynamic routing system 108 can determine a network 106 to route the call based on a number of factors. These factors can include, for example: the origin of the call; the destination of the call; the price charged to the dynamic routing system 108 to route a call over a communication network 106 and/or the price charged by the dynamic routing system 108 to receive a call from a communication network 106; network characteristics; geolocation of a caller; a pattern in historical call data; and/or the like. Some of these factors are discussed in more detail below.

In FIG. 1, several potential communication paths exist to connect the mobile device 102 to the mobile device 104 via the communications network providers 106 and the dynamic routing system 108. For example, a call from the mobile device 102 may be routed from the communications network 106A to the dynamic routing system 108, from the dynamic routing system 108 to the communications network 106C, and then from the communications network 106C to the mobile device 104. In some embodiments, the call from the mobile device 102 may be initially routed from the communications network 106A to the dynamic routing system 108. The dynamic routing system 108, based on one or more routing criteria, may subsequently instruct the mobile device 102 to use the communication network 106B to complete the call. Completing the call with the communications network 106B may include initiating a new call to the mobile device 104 using the communication network 106B. In certain embodiments, the initial call to the dynamic routing system 108 and the subsequent call to the mobile device 104 may occur with or without knowledge of the user initiating the call on the mobile device 102. Although a limited number of communication networks and call paths are illustrated in FIG. 1, it is possible for additional paths via additional communication networks to exist to connect the mobile device 102 with the mobile device 104. Further, note that although only one dynamic routing system 108 is illustrated, it is possible for multiple dynamic routing systems 108 to exist and for each dynamic routing system 108 to communicate with a number of communication networks, such as the communications network providers 106 in FIG. 1 and other dynamic routing systems 108.

In some embodiments, the dynamic routing system 108 includes a call routing module 114, a call criteria database 112, and a caller profile database 110. In some implementations, the dynamic routing system 108 may include multiple call routing modules 114, call criteria databases 112, and/or caller profile databases 110. Although illustrated as subsystems, it is possible in some embodiments for the call routing module 114, call criteria database 112, and/or caller profile database 110 to be separate systems that are external to the dynamic routing system 108 and with which the dynamic routing system 108 may communicate. The call criteria database 112 can include or store criteria for selecting a network using a particular network protocol by the call routing module 114, as described further herein. The caller profile database 110 can store profile information of a caller, such as historical call data, a pattern identified for callers, geolocation of the caller, and/or the like.

The call routing module 114 can route a call initiated by the mobile device 102 across one or more communication networks 106. To determine the one or more communication networks 106 upon which to route the call, the call routing module 114 can identify or determine call information associated with the call and use the identified information to facilitate selection of communication network 106. The call information may include network characteristics such as throughput and latency, supported network protocols of the mobile devices and/or available communication networks for the call, supported communication frequencies, and/or the like. Further, in some embodiments, the call information may include price or rate information for a cell phone plan of the caller user and/or the recipient user, and/or price or rate information for one or more of the communication networks to route the call on behalf of the dynamic routing system 108 or the one or more other communication networks.

The call routing module 114 can include any system that can receive a call and determine where to route the call. The call may be received from a communications network 106, an entity and/or processor associated with the communications network 106, the mobile device 102, the mobile device 104, the dynamic routing system 108, or any other system capable of providing the call to the call routing module 114. Further, the call routing module 114 can include any system that can provide and/or route a call to another system. This call can be provided to a communications network 106, an entity and/or processor associated with the communications network provider 106, the mobile device 102, the mobile device 104, and/or any other system capable of receiving the call from the call routing module 114. In addition, the call routing module 114 can include any system capable of providing and/or receiving call information associated with a call.

The call routing module 114 can prioritize and/or rank certain communications networks 106 or provider of communication networks. The call routing module 114 can include any system capable of receiving call information associated with a call and/or determining a ranked order routing list of networks 106 and/or communications network providers to which to route the call. For example, the call routing module 114 can be implemented by one or more computing systems and each computing system can include one or more processors. In certain embodiments, the call routing module 114 can implement one or more of the systems and/or perform one or more of the processes for routing a call that is disclosed in U.S. Pat. No. 9,124,957, issued on Sep. 1, 2015 and titled "SYSTEM AND METHOD FOR DYNAMIC MULTIFACTOR ROUTING," the entire disclosure of which is hereby incorporated by reference herein for all purposes.

In some embodiments, the call routing module 114 can rank a number of communications networks 106 to process a call. The call routing module 114 can receive call information associated with the call. Using the call information, the call routing module 114 can perform one or more ranking processes to determine a ranked routing list of communication networks. The ranked routing list can indicate a ranked order for communication networks and/or communication network providers that are capable of routing the call and that satisfy a set of network selection criteria. The call routing module 114 can include any system capable of determining the ranked order routing list for a call based on a number of criteria or factors. The call routing module 114 can rank the available networks 106 and/or communications network providers based on certain weighted values for the networks and/or communications network providers. For example, the weightings can be determined based on a network throughput capability, a price or profit margin when using a network and/or the communication network provider, a caller profile retrieved from the caller profile database 110, a certain criteria of a call retrieved from the call criteria database 112, such as a geographical location, a current number of calls routed to the network 106, a network and/or associated communication network provider rating, and/or the like.

Maintaining Multiple Communication Paths for Mobile Devices

As described above, the dynamic routing system 108 may route a received call to different communication networks (e.g., cellular networks). For example, the dynamic routing system 108 may instruct a mobile device to use a particular communication network to complete the call. In this example, the system 108 may use routing criteria to select the particular communication network. Example routing criteria may be based on availability of the particular communication network as compared to other communication networks, call signal strength, and so on. Thus, the dynamic routing system 108 may cause a mobile device to use a communication network which is advantageous for a user's location, intended location, a cost structure, and so on.

To implement the call described above, the Session Initiation Protocol (SIP) may be used to effectuate Voice over IP (VoIP) calls, Voice over LTE (VoLTE) calls, and so on.

SIP may fix a placed call as corresponding to a particular IP address/port pair associated with a mobile device. For example, the mobile device may obtain an IP address from a communication network to which it is connected (e.g., a cellular network). In this example, the cellular network may assign the IP address to the mobile device. An operating system on the mobile device may enable communications at a particular port. In this way, the IP address/port pair may be used by the mobile device. When placing a call, SIP messages from the mobile device may identify this IP address/port pair such that the call may be effectuated via the standardized SIP protocol. This IP address/port pair connection to the dynamic routing system 108 may be referred to herein as a communication path.

The above-described call may terminate or fail during the call for various reasons. For example, the mobile device may lose connection to the above-described cellular network. This loss of connection will result in the call being dropped. Additionally, to reestablish the call the mobile device will have to connect to the dynamic routing system 108 again. SIP messages will need to be provided via an alternate cellular network to reestablish the call. This process may take a substantial amount of time (e.g., 2 minutes, 3 minutes, and so on), thus reducing a user experience of such networked mobile phones.

Figure 2A:
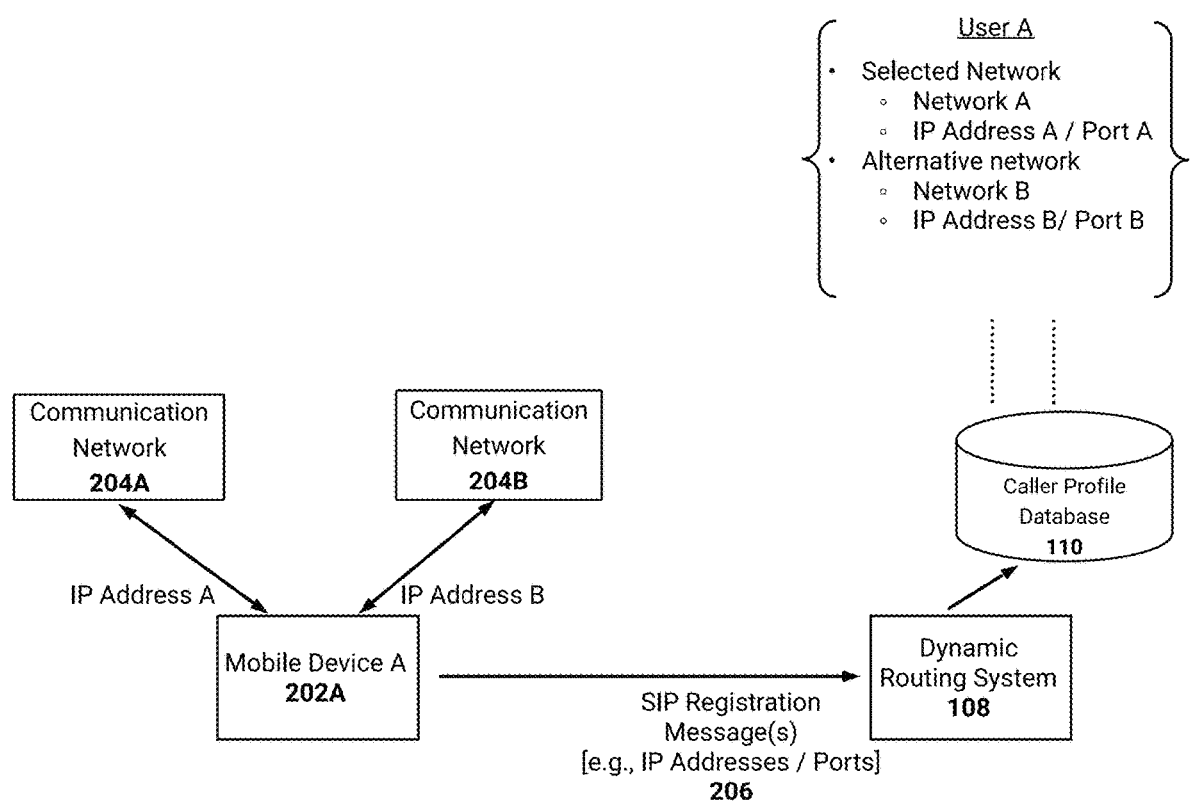
FIG. 2A is a block diagram illustrating a first mobile device in communication with an example dynamic routing system.
Figure 2B:
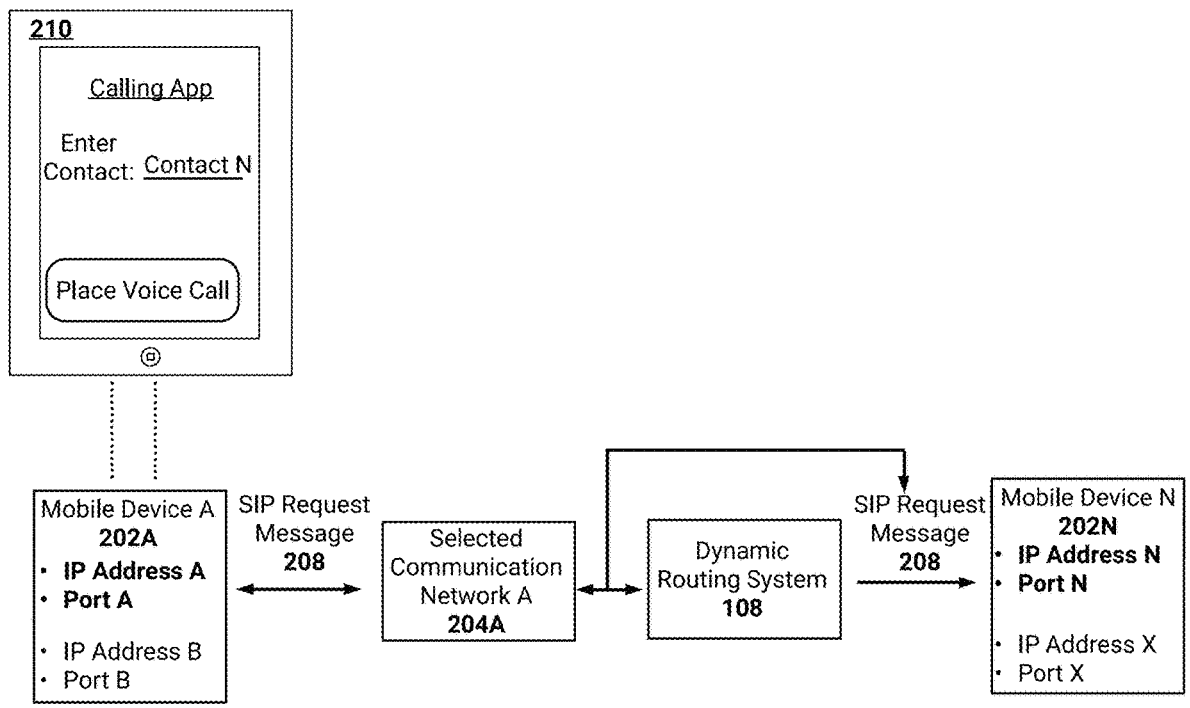
FIG. 2B is a block diagram illustrating the first mobile device providing message(s) associated with a call to a second mobile device over a first communication network.
Figure 2C:
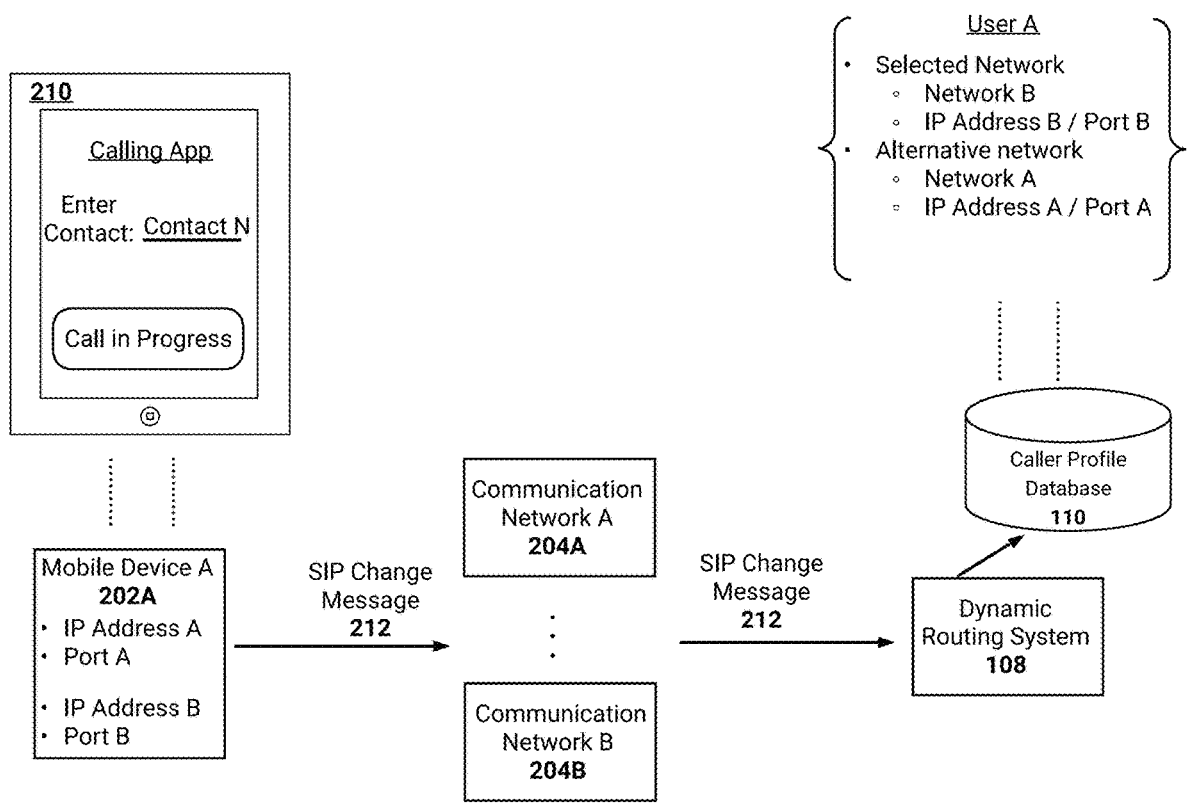
FIG. 2C is a block diagram illustrating the first mobile device providing a change message to the example dynamic routing system during the call.
Figure 2D:
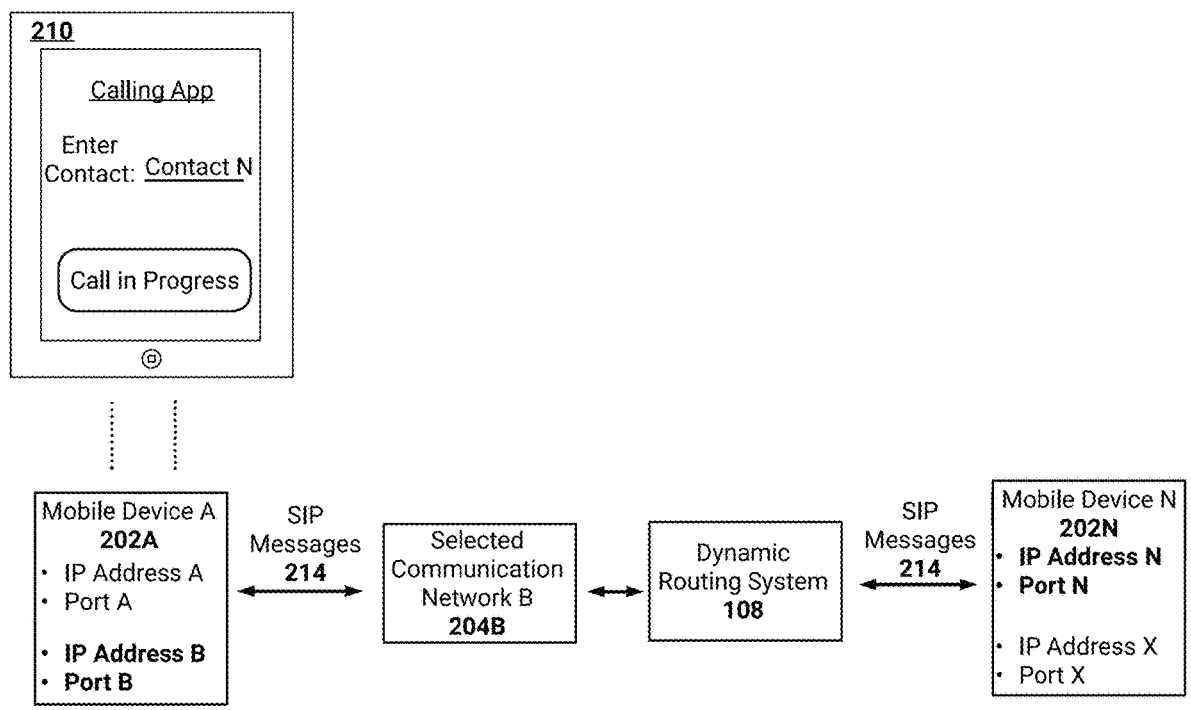
FIG. 2D is a block diagram illustrating the first mobile device providing message(s) associated with the call to the second mobile device over the second communication network.
Figure 3:
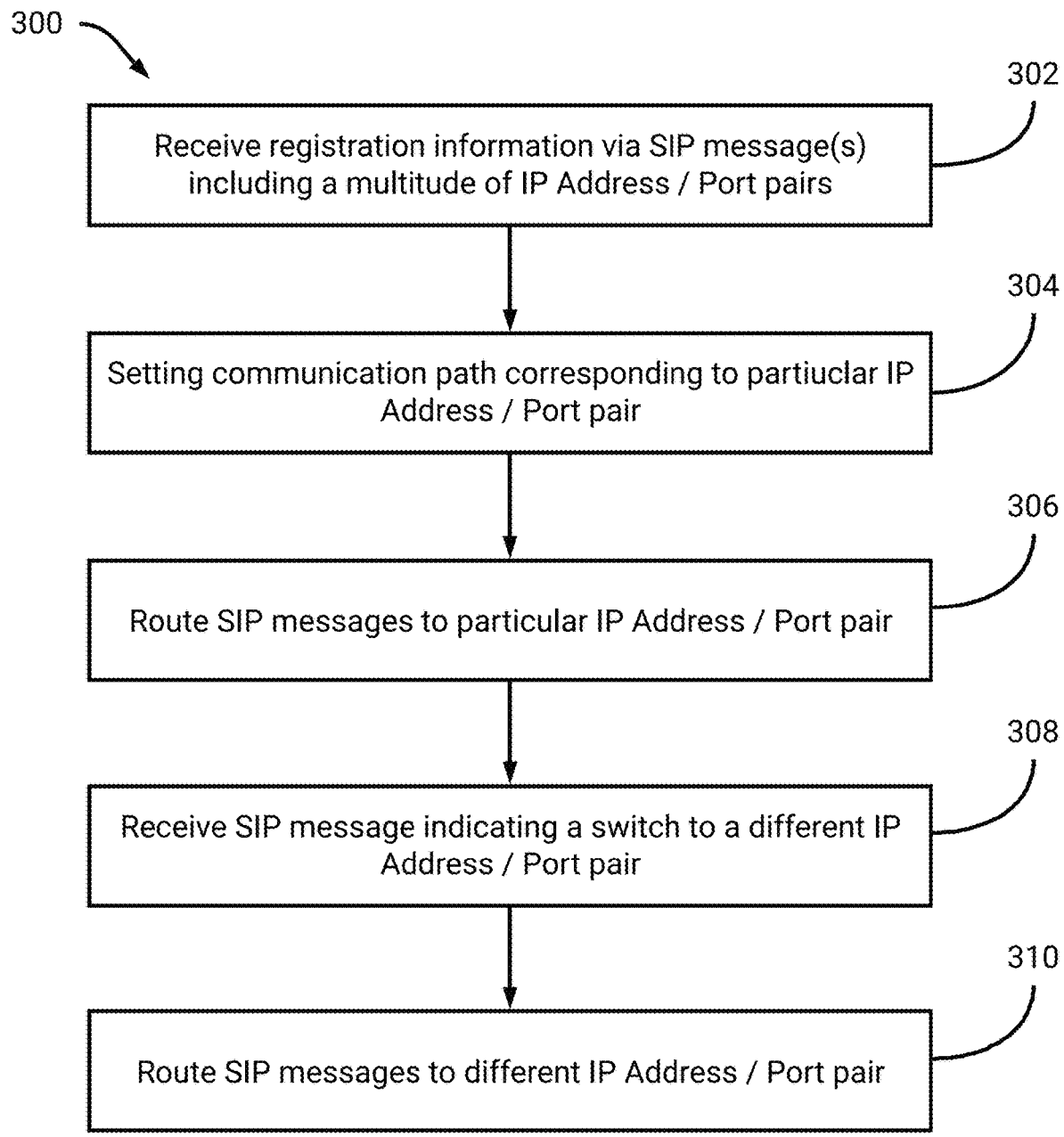
FIG. 3 is a flowchart of an example process for establishing a call with multiple communication paths over a same connection.

Described below, in FIGS. 2A-3, are techniques to enable multiple communication paths. As an example, the above-described call may be routed in substantially real-time to an alternate communication path. For example, the mobile device may communicate with an alternate cellular network via an alternate IP address/port pair. Advantageously, this may occur via enhancements to SIP which are backwards compatible with other mobile devices, SIP computing systems or servers, and so on.

FIG. 2A is a block diagram illustrating a first mobile device (e.g., mobile device 202A) in communication with an example dynamic routing system 108. The mobile device 202A may be an example of a user device, such as a smart phone, tablet, wearable device, laptop, and so on. The mobile device 202A may be in communication with multiple communication networks 204A-204B which provide network access to the device 202A (e.g., internet access). In some embodiments the mobile device 202A may be similar to the devices described in FIG. 6 below. Additionally, the mobile device 202A may include an enhanced SIP stack, or may execute a calling application which includes the enhanced SIP stack, to leverage the enhancements described herein. The dynamic routing system 108 may be in communication with the mobile device 202A and be used to instruct the device 202A to communicate via a particular communication network as described in FIG. 1.

Upon the mobile device 202A turning on, such as via booting up, the mobile device 202A may connect to (e.g., register with) accessible communication networks. For example, the mobile device 202A may have two or more SIM cards which are associated with different communication networks. Optionally, the mobile device 202A may connect at a same time to these different communication networks. Optionally, the mobile device 202A may connect sequentially to these communication networks. These communications networks may then assign IP addresses to the mobile device 202A. In this way, the mobile device 202A may be accessible via the communication networks. In the illustrated example, communication network 204A has assigned mobile device 202A IP address A while communication 204B has assigned mobile device 202A IP address B.

In addition to the IP addresses, the mobile device 202A may associate open ports with the IP addresses. In this way, the mobile device 202A may be assigned IP address/port pairs from which it can initiate communications. For example, the mobile device 202A may associate IP address A with port A of the device 202A. In this example, an operating system or application executing on the mobile device 202A may assign port A. Similarly, the mobile device 202A may associate IP address B with port B.

The mobile device 202A may register with the dynamic routing system 108, such that it can leverage the enhancements provided by the system 108. For example, and as described above, the dynamic routing system 108 may instruct the mobile device 202A to utilize a particular communication network which is advantageous for the location.

As illustrated, the mobile device 202A is providing registration messages 206 which indicates the IP address/port pairs at which the device 202A is accessible. This information may be provided as one or more SIP message to the dynamic routing system 108. As an example, a SIP message may indicate identifying information associated with the mobile device 202A. This identifying information may include a particular IP address and port pair in a header of the SIP message (e.g., IP address A/port A).

Furthermore, the above-described SIP message may include information identifying other IP address/port pairs (e.g., IP address B/port B). For example, the SIP message may include a header which is not part of the present SIP standard. In this example, the header may be customized for recognition by an enhanced SIP stack. The header may include, or otherwise identify, the IP address/port pairs at which the mobile device 202A may be reached. As another example, the SIP message may include the other IP address/port pairs as information appended to the SIP message. As another example, the SIP message may include a second media channel or header which includes the other IP address/port pairs. In some embodiments, additional media channels or headers may be included based on a number of IP address/port pairs which are usable by the mobile device 202A.

The dynamic routing system 108 may obtain the registration information 206 and identify the IP address/port pairs. These may be stored in a database (e.g., the caller profile database 110) as being associated with the mobile device 202A. To identify the IP address/port pairs, the dynamic routing system 108 may identify one or more headers in the received messages 206 which are associated with the IP address/port pairs.

For example, a header which is standardized in SIP may be used to identify IP address A. As another example, a non-standardized header may be identified by the system 108 as indicating IP address B. In this example, the system 108 may execute an enhanced SIP stack to identify this non-standardized header. As another example, IP address B may be appended to the message, or included as extraneous information which is detectable by the system 108. The extraneous information may be identified by a unique character string which is known to the system 108. For example, the unique character string may represent a header or a beginning portion of information. As another example, the header may include, or otherwise identify, IP address A/port A and IP address B/B.

An example of the information stored in the database 110 is illustrated in FIG. 2A. In this example, the information indicates that for a user of the mobile device 202A (e.g., User A), there are two IP address/port pairs. These IP address/port pairs are described herein as communication paths which are available to the mobile device 202A. Thus, the mobile device 202A may be configured to communicate over either, or both, of the communication paths. While two communication paths, and two IP address/port pairs, are described above, as may be appreciated there may be any number of communication paths and IP address/port pairs. For example, there may be 3, 5, 7, 15, communication paths and IP address/port pairs.

The illustrated information additionally indicates a presently selected communication path for the mobile device 202A. This path may be selected by the dynamic routing system 108 as described in FIG. 1. For example, the path may correspond with a greatest signal strength, lowest cost, and so on. Optionally, the mobile device 202A may select a preferred communication network. In this example, the user of the mobile device 202A may indicate a preferred communication network to be used.

As will be described below, subsequent to registering the mobile device 202A may place calls (e.g., voice calls, video calls) over the selected communication path. For example, the mobile device 202A may place calls via Network A using IP address A/port A.

FIG. 2B is a block diagram illustrating a first mobile device (e.g., mobile device 202A) providing message(s) associated with a call to a second mobile device (e.g., mobile device 202N) over a first communication network 204A. As described above, the first mobile device 202A may register with the dynamic routing system 108 to provide accessible IP address/port pairs. Subsequently, the first mobile device 202A may place a call via SIP to the second mobile device 202N.

In the illustrated example, the first mobile device 202A is presenting a user interface 210 associated with a calling application. The calling application may represent an application (e.g., an 'app') obtained from an online application store. This application may implement the enhanced SIP stack described herein. As illustrated, a user of the first mobile device 202A has indicated that he/she prefers to call 'Contact N'. While the illustrated example describes use of an application, in some embodiments the first mobile device 202A may be a custom device which executes the enhanced SIP stack described herein. For example, the device 202A may execute a custom version of a mobile operating system (e.g., ANDROID).

Subsequent to this selection of 'Contact N', the first mobile device 202A may provide a SIP request message 208 via communication network 204A to the dynamic routing system 108. As described above, the first mobile device 202A has two IP address/port pairs at which it is accessible. In the illustrated embodiment, IP address A/port A is being utilized to provide the SIP request message 208. In some embodiments, the dynamic routing system 108 may select one of the IP address/port pairs upon receiving an indication that the first mobile device 202A is attempting to place a call to the second mobile device 202N.

The SIP request message 208 may thus include information usable to identify the second mobile device 202N. In addition, the request message 208 may include information such as a type of audio to be used (e.g., G711), and so on. The dynamic routing system 108 may be in communication with IP address A/port A via a particular port of the system 108. In addition, while not presently used, the system 108 may be configured to communicate with IP address/port B via the particular port or a different port of the system 108. For example, port B may of the first mobile device 202A may be kept open or in a state to receive SIP messages from the system 108.

The SIP request message 208 may then be provided to the second mobile device 202N to establish the call. The SIP request message 208 may, in some embodiments, be a standard SIP message which does not identify both IP address A/port A and IP address B/port B. In these embodiments, the SIP request message 208 may thus identify an address at which the second mobile device 202N is to use to provide information to the first mobile device 202A. For example, the information may reflect an address associated with the system 108 (e.g., an IP address, port, or other identifier). As another example, the information may reflect information usable to identify the first mobile device 202A such that the system 108 can route messages or information from device 202N to device 202A In some embodiments, the SIP request message 208 may include information associated with the enhanced SIP stack described herein. For example, the SIP request message 208 may indicate the two communication paths available to the first mobile device A. In this example, the two communication paths may represent IP address A/port A and IP address B/port B. The SIP request message 208 may conform to standardized SIP messages, such that the SIP message 208 indicates the requesting device (e.g., the first mobile device 202A and first communication path). The SIP message 208 may also include information indicating the second communication path, however this may be ignored by the mobile device N 202N if it does not implement the enhanced SIP stack described herein.

The second mobile device 202N may then respond indicating acknowledgement of the received message 208. For example, the second mobile device 202N may respond indicating an OK message (e.g., message code 200). In this way, the first mobile device 202A and second mobile device 202N may establish the call and communicate with each other.

While the above describes the dynamic routing system 108 receiving, and routing, messages, in some embodiments the first mobile device 202A may provide messages to the second mobile device 202N (e.g., directly to device 202N). For example, the first mobile device 202A and second mobile device 202N may be custom devices which execute the enhanced SIP stack described herein. Thus, these devices may directly establish communications and provide messages to each other. For example, the second mobile device 202N may receive information in a SIP header indicating IP address A/port A and IP address B/port B. thus, the second mobile device 202N may provide messages to at least one of these IP address port pairs. As an example, mobile device 202N may receive information indicating a preferred communication path and thus provide messages to a specific IP address port pair. As another example, mobile device 202N may provide information to both IP address port pairs and the mobile device 202A may drop messages which arrive to one of the IP address port pairs after the other IP address port pairs (e.g., as described in more detail below).

FIG. 2C is a block diagram illustrating the first mobile device 202A providing a change message 212 to the example dynamic routing system 108 during the call described in FIG. 2A. During the call, the first mobile device 202A may lose communication with communication network A 204A. As illustrated in FIGS. 2A-2B, this communication network A 204A was selected for use in communicating with the second mobile device 202N. Advantageously, the established call may be maintained over a different communication path while preserving the same SIP connection between the first mobile device 202A and the second mobile device 202N.

The first mobile device 202A may detect that it has lost communication with communication network A 204A, and may then transmit a SIP change message 212 to the dynamic routing system 108. Since its connection to communication network A 204A has been lost, the first mobile device 202A may provide the message 212 via the second communication path (e.g., communication network B 204B). As described above, the first device's 202A connection may be maintained via, for example, port B being kept open. Thus, the first mobile device 202A may seamlessly provide the message 212 to the dynamic routing system 108. As described in FIG. 2A, the system 108 may store information identifying that the first mobile device 202A is configured to communication via network B 204B. Thus, the system 108 may respond to the change message 212 received via this second communication path.

In some embodiments, the dynamic routing system 108 may detect that the first mobile device 202A has lost connection with communication network A 204A. In these embodiments, the loss of connection may be determined based on a loss of a 'heartbeat' or periodically sent acknowledgement SIP message provided by first mobile device 202A to the system 108. Additionally, in some embodiments the system 108 may periodically poll the first mobile device 202A to ensure communications. If the system 108 detects the loss of connection, the system 108 may then automatically switch to use of the second communication path.

The above-described SIP change message 212 may be provided as a SIP message, which indicates that the dynamic routing system 108 is to route communications from the second mobile device 202N to the first mobile device 202A via the second communication path. Thus, the communications may be provided to the first mobile device 202A over Network B using IP address B/port B.

The SIP change message 212 may optionally be a customized message which is identifiable by the dynamic routing system 108 using the enhanced SIP stack as described herein. In some embodiments, the SIP change message 212 may identify the second communication path (e.g., the specific IP address B/port B). For example, the message 212 may indicate that the second path is to be utilized. In some embodiments, the SIP change message 212 may indicate an identifier associated with the second communication path. This identifier may be associated in the database 110 with the second communication path. As illustrated, the database 110 may be updated to reflect that the selected communication path is now IP address B/port B.

The first mobile device 202A may then receive SIP messages, and transmit SIP messages, via the second communication path (e.g., IP address B/port B). In this way, SIP messages from the second mobile device N 202N may be rapidly switched to the second communication path to preserve the established call.

Optionally, the SIP change message 212 may be provided proactively (e.g., prior to loss of communication with communication network A 204A). For example, and as described in U.S. patent application Ser. No. 16/869,431, a determination may be made that the connection with communication network A 204A is going to drop. This determination may be made by the first mobile device 202A and/or dynamic routing system 108 based on a signal strength associated with the connection to communication network A 204A. This determination may also be made based on information indicating historical signal strengths for different geographic locations. For example, the first mobile device 202A and/or system 108 may determine that the first mobile device A 202A is heading in a direction associated with a loss of signal or reduction of signal below a threshold.

In the above-described example, the first mobile device 202A may then provide the SIP change message 212 to the dynamic routing system 108. The first mobile device 202A may provide the message 212 via the communication network A 204A (e.g., if still connected) or via the communication network B 204B.

FIG. 2D is a block diagram illustrating the first mobile device 202A providing message(s) 214 associated with the call to the second mobile device 202N over the second communication network 204B. As described in FIG. 2C, the first mobile device 202A may rapidly switch between communication paths while preserving the established call. Thus, and as illustrated, the first mobile device 202A may maintain the call via receiving, and transmitting, SIP messages at IP address B/port B. Similarly, the dynamic routing system 108 may be updated to transmit received SIP messages to IP address B/port B of the first mobile device 202A. In some embodiments, the system 108 may update a port at which it is configured to communicate with the first mobile device 202A.

While the description in FIG. 2A-2D focused on the first mobile device 202A establishing a call, the first mobile device 202A may similarly receive calls from other mobile devices.

For example, FIG. 2A illustrates the first mobile device 202A registering with the dynamic routing system 108. Upon registration, the dynamic routing system 108 may have information indicating a selected communication path for the first mobile device 202A. If the second mobile device 202N places a call directed to the first mobile device 202A, a SIP message associated with the requested call may be provided to the dynamic routing system 108. The system 108 may identify which communication path is selected for the first mobile device 202A, and then route the SIP message via the selected communication path.

Similar to FIG. 2C, the first mobile device 202A may update the communication path via a SIP change message. For example, the dynamic routing system 108 may provide received SIP messages to the first mobile device 202A via a second communication channel.

FIG. 3 is a flowchart of an example process 300 for establishing a call with multiple communication paths over a same communication connection. For convenience, the process 300 will be described as being performed by a system of one or more computers (e.g., the dynamic routing system 108).

At block 302, the system receives registration information from a first device via one or more SIP messages. As described in FIG. 2A, the registration information may indicate a multitude of IP address/port pairs which are usable by the first device. These IP address/port pairs may represent communication paths between the first device and the system. The registration information may be provided as a SIP message which includes a first IP address/port pair in an identifying portion of the message. The SIP message may further include remaining IP address/port pairs in a different portion of the message, such as in one or more new added medical channels. In some embodiments, two or more SIP messages may be used to include the first IP address/port pair and remaining IP address/port pairs.

At block 304, the system sets a preferred communication path for the first device. The system may instruct the first device to communicate via a particular communication network (e.g., a particular cellular network). The communication path which is associated with this particular communication network may be set as the preferred path. In some embodiments, the system may receive information identifying the preferred communication path from the first device.

At block 306, the system routes SIP messages to the first device via the preferred communication path. The first device may place a call to a second device, and one or more SIP messages may be transmitted between the first device and second device to establish the call. For example, the first device and second device may be connected via an established SIP connection. SIP messages may be routed between the first device and second device via the established SIP connection.

At block 308, the system receives a SIP message indicating a switch to a different communication path. As described in FIG. 2C, the first device may lose communication with a communication network associated with the preferred communication path. Subsequently, the first device may provide a SIP message which causes the system to update the routing of SIP messages to the different communication path. Optionally, the system may identify the lost communication and update the routing to the different communication path.

At block 310, the system routes the SIP messages to the different communication path. The routing may be updated in substantially real-time such that the established SIP connection may be maintained. For example, the different communication path may be set for the previously established SIP connection. As may be appreciated, without the techniques described herein, the SIP connection would be severed upon the first device's loss of communication with the communication network.

Maintaining Multiple Communication Paths for Endpoints

FIGS. 2A-3 include description related to maintaining multiple communication paths for a single SIP connection between two mobile devices. Since mobile devices consume cellular bandwidth, and thus may incur fees, it may be preferable to have one of the communication paths active at any one time. That is, it may be preferable to have only one cellular network in use at one time. Thus, and as described in FIG. 2C, a mobile device may provide a SIP change message to cause the dynamic routing system 108 to update a communication path to the mobile device. This may cause the mobile device to utilize a different cellular network.

However, for certain endpoints (e.g., IP phones, mobile or user devices connected to WiFi), it may be advantageous to have the different communication paths active at a same time. For example, an IP phone may be connected via a dedicated private line to a computing system or server which enables calling. In this example, the IP phone may be connected to systems associated with SIP trunking or VoIP. As another example, the IP phone may also be connected via the internet as a backup to the dedicated private line.

In the above-described example IP phone, the dynamic routing system 108 may register both the private line and the internet connection. For example, the dynamic routing system 108 may utilize a first port for the private line and a second port for the internet connection. Similarly, the IP phone may have ports associated with the private line and the internet connection. Thus, the IP phone may have two communication paths with the dynamic routing system 108. While two communication paths are described, as may be appreciated any number of paths may be utilized. For example, 3, 5, 9, 17, and so on, paths (e.g., different ports) may be utilized.

A user of the IP phone may establish a SIP connection with another phone, such that the user may converse with a different user. When the user is utilizing the IP phone, such as via talking to the other user, the IP phone may transmit SIP messages via both communication paths at the same time. The dynamic routing system 108 may thus receive two SIP messages which were generated at substantially similar times, but which were provided via different communication paths. One of the two SIP messages which was received first may be transmitted to the other phone. The remaining of the two SIP messages may be discarded. Similarly, SIP messages being received from the other phone may be provided over the two communication paths to the IP phone. The SIP message which arrives first may be maintained by the IP phone and provided as output to the user (e.g., voice output).

In this way, if the dedicated line or internet connection fail, the IP phone may maintain the remaining communication path. This may substantially eliminate calls being dropped over such SIP connections. While the above focused on a dedicated line and an internet connection, it may be appreciated that other communication paths are possible. For example, two internet connections may be made. In this example, each internet connection may be connected to a different backbone system used to transmit calls. One of the backbone systems may experience downtime, which may therefore cause a call to be dropped. In the techniques described herein, the remaining backbone system would continue relaying SIP messages to the IP phone.

Figure 4A:
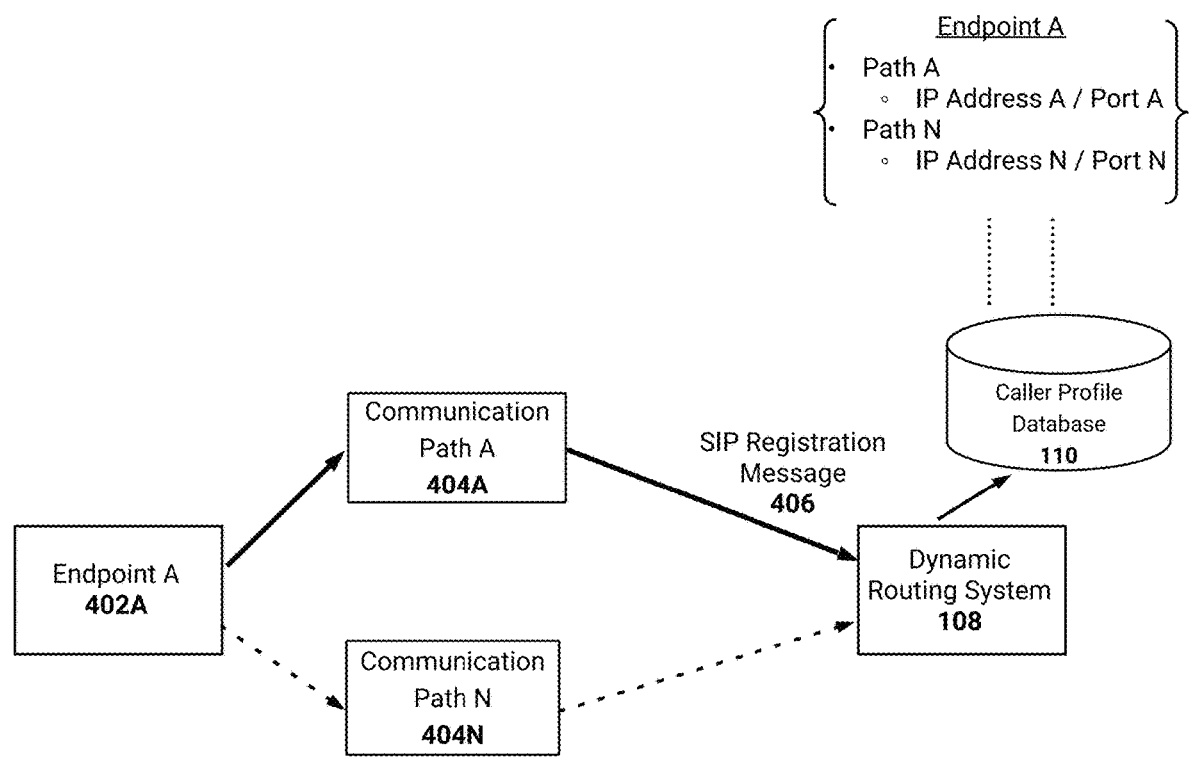
FIG. 4A is a block diagram illustrating a first endpoint in communication with the example dynamic routing system.

FIG. 4A is a block diagram illustrating a first endpoint 402A in communication with the example dynamic routing system 108. The first endpoint 402A may represent a device, such as an internet or IP phone. The first endpoint 402A may also represent a user device or mobile device, such as a laptop, tablet, wearable device, smartphone, and so on. Advantageously, the first endpoint 402A may utilize the enhanced SIP stack as described herein. With respect to an IP phone, the first endpoint 402A may include firmware or software which implements encoder and decoder functionality according to the techniques described herein.

The first endpoint 402A may be connected to different communication paths 404A-404N. For example, a first communication path 404A may represent a dedicated private line while a second communication path 404 may represent an internet connection. The first endpoint 402A may provide a SIP registration message 406 to the dynamic routing system 108. This SIP registration message 406 may indicate IP address/port pairs associated with the communication paths 404A-404N. As an example, a first IP address/port pair may be identified in an identifying portion of the message 406 (e.g., a user-agent portion). Additional IP address/port pairs may be included in a different portion which is recognizable by a decoder of the enhanced SIP stack. For example, these additional IP/address port pairs may be included in an added (e.g., second) media channel of the SIP message. Similar to the description of FIG. 2A, the dynamic routing system 108 may update a database 110 to reflect the communication paths.

Optionally, the first endpoint 402A may provide the SIP registration message 406 via communication path A 404A. For example, this may represent a preferred communication path for the first endpoint 402A.

Optionally, the SIP registration message 406 may be provided over both communication paths 404A-404N. As described above, the dynamic routing system 108 may identify which message 406 was received first and discard the other message 406. Optionally, the system 108 may identify timestamps included in the message. The system 108 may then discard a later message.

Figure 4B:
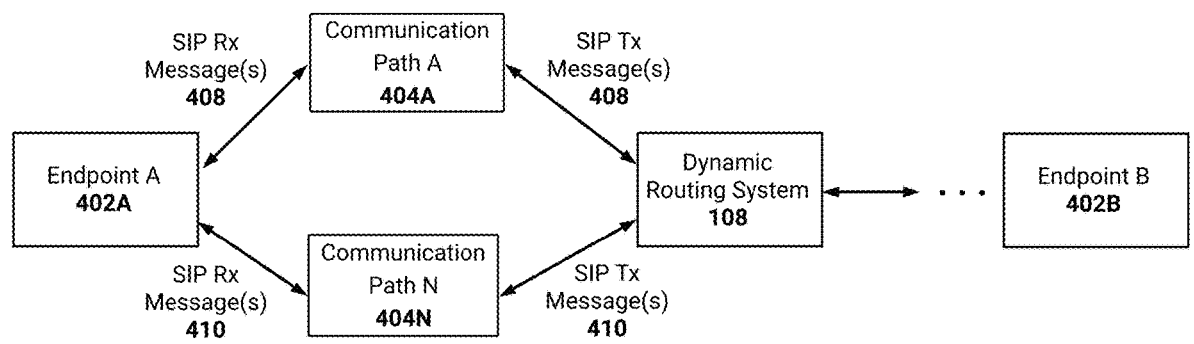
FIG. 4B is a block diagram illustrating the first endpoint in communication with a second endpoint via multiple paths over a same connection.

FIG. 4B is a block diagram illustrating the first endpoint 402A in communication with a second endpoint 402B via multiple paths over a same SIP connection. In the illustrated embodiment, the first endpoint 402A is transmitting SIP messages 408 to the second endpoint 402B via the communication paths 404A-404N. As described above, the dynamic routing system 108 may assign two ports to receive the messages 408 from the first endpoint 402A via the communications paths 404A-404N. Similarly, the first endpoint 402A may receive SIP messages 410 from the second endpoint 402B via the communication paths 404A-404N.

The dynamic routing system 108 may thus receive two of the same SIP messages 408 over the communication paths 404A-404N. For example, as a user of endpoint A 402A speaks, SIP messages 408 may be generated. In this example, the endpoint A 402A may transmit the SIP messages 408 via both communication paths 404A-404N. The dynamic routing system 108 may therefore periodically receive the same SIP message via the communication paths 404A-404N.

Thus, and as an example, the first endpoint 402A may transmit a first SIP message via communication path 404A and also transmit the first SIP message via communication path 404N. As may be appreciated, the dynamic routing system 108 may receive the first SIP message from each communication path at slightly different times. For example, the timing may vary for each communication path due to network congestion, a number of network hops, and so on.

In this way, the dynamic routing system 108 may receive the above-described first SIP message from communication path 404A at a particular time (e.g., t0) while receiving the first SIP message from communication path 404N at a different time (e.g., t0+x). 'x' may represent an offset.

The dynamic routing system 108 may identify that the SIP message received at t0, and at t0+x, are the same message based on the information included in the messages. For example, the system 108 may compute a hash of the messages and compare the resulting values. As another example, the messages may include timestamp information which may be equal to each other. As another example, the messages may be assumed to be the same if received within a threshold amount of time of each other.

The dynamic routing system 108 may therefore discard the SIP message which was received at time t0+x. The other SIP message may be transmitted to the second endpoint 402B.

Figure 4C:
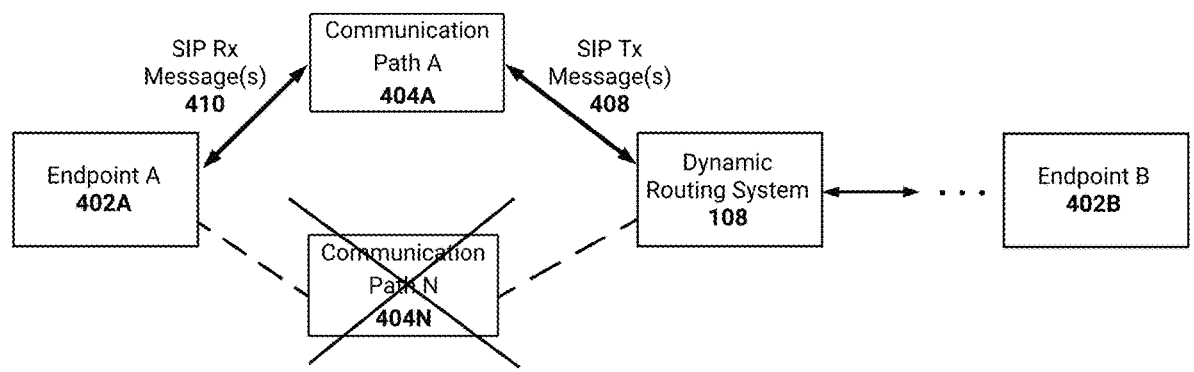
FIG. 4C is a block diagram illustrating the first endpoint maintaining the same connection with the second endpoint during a failure of one of the multiple paths.

FIG. 4C is a block diagram illustrating the first endpoint 402A maintaining the SIP connection with the second endpoint 402B during a failure of one of the communication paths. In the illustrated example, communication path 404N is no longer accessible to the first endpoint 402A. As an example, communication path 404N may represent an internet connection which has been severed or for which packets are being lost. In this example, the internet connection may be undergoing a denial of service attack. As another example, communication path 404N may represent a private dedicated line. In this example, a physical cord associated with the dedicate line may have been inadvertently disconnected.

As illustrated, the first endpoint 402A is still able to transmit SIP messages 408 to the second endpoint 402B via communication path 404A. Similarly, the first endpoint 402A is able to receive SIP messages 410 via communication path 404A. In this way, the same SIP connection may be maintained even with a failure of a communication path (e.g., path 404N).

Figure 5:
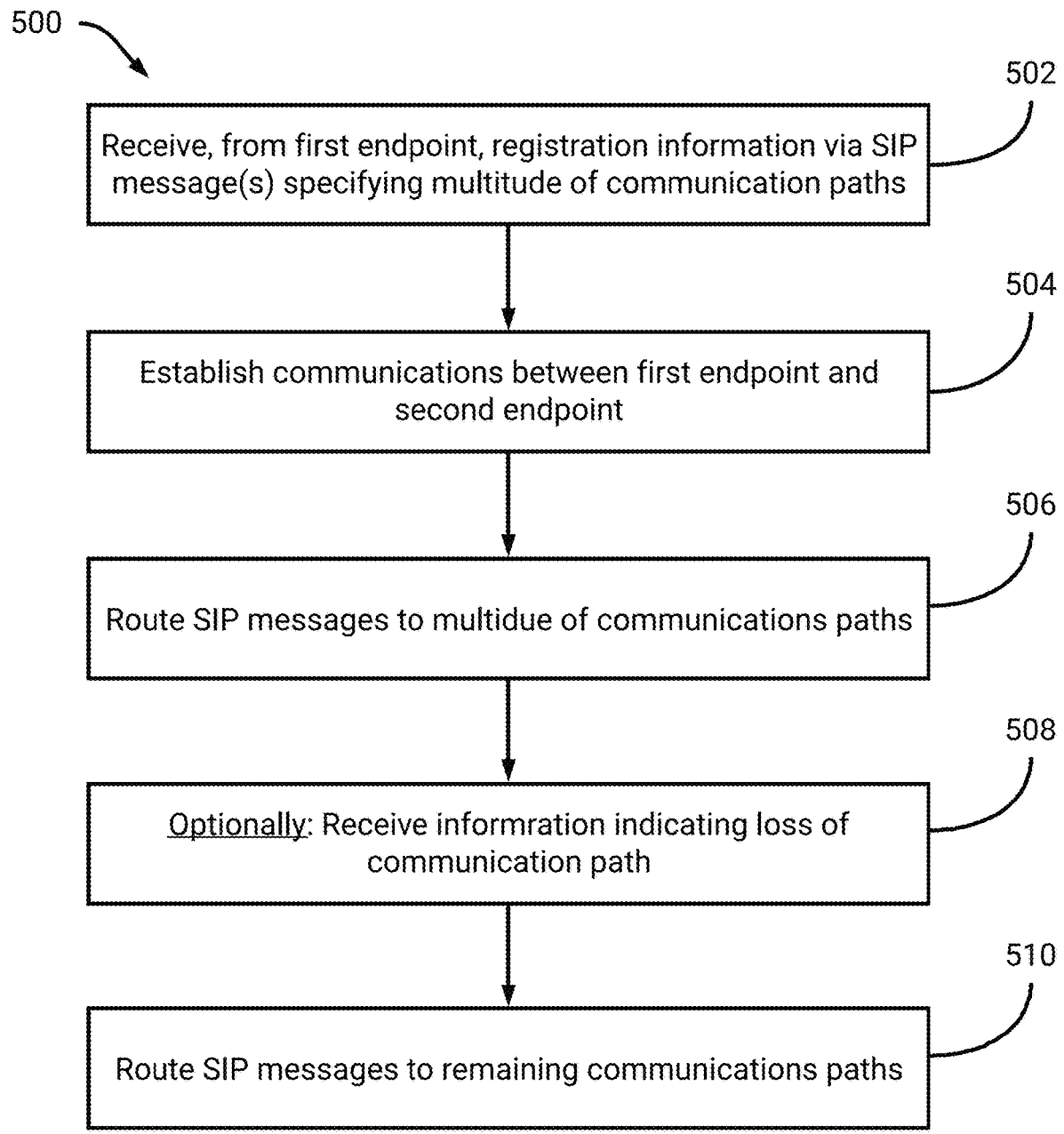
FIG. 5 is a flowchart of another example process for establishing a call with multiple paths over a same connection.

FIG. 5 is a flowchart of another example process 500 for establishing a call with multiple paths over a same connection. For convenience, the process 500 will be described as being performed by a system of one or more computers (e.g., the dynamic routing system 108).

At block 502, the system receives registration information from a first endpoint via a SIP message. As described above, the SIP message may be enhanced to indicate multiple communication paths available to the first endpoint. Each communication path may indicate an IP address/port pair at which the first endpoint is accessible. The system may optionally assign a number of ports of the system based on the indicated IP address/port pairs. For example, each IP address/port pair of the first endpoint may be in communication with a separate port of the system. As another example, each IP address/port pair may be in communication with a same port of the system. As another example, individual subsets of the IP address/port pairs may be in communication with a same port of the system.

At block 504, the system establishes communications with a second endpoint. The first endpoint may transmit a SIP message associated with establishing a call with a second endpoint. The system may route this SIP message to the second endpoint.

At block 506, the system routes SIP messages via the communication paths. As illustrated in FIG. 4B, the system may receive SIP messages via the multiple communication paths. Similarly, the system may transmit SIP messages from the second point to the first endpoint via the multiple communication paths. As described above, the system may transmit a single copy of a SIP message received from the first endpoint via a communication path while discarding other copies received via other communication paths. Similarly, the first endpoint may process a single copy of a SIP message received from the second endpoint via a communication path while discarding other copies received via other communication paths.

At block 508, the system optionally receives information indicating loss a particular communication path. The system may detect that it has stopped receiving SIP messages from the first endpoint via the particular communication path.

At block 510, the SIP messages may thus be routed from the system to remaining communication paths. In some embodiments, the system may transmit information to the first endpoint indicating the loss of connection. This information may optionally be received as a SIP message, and may be processed by the first endpoint. In some embodiments, the first endpoint may present information identifying the loss of connection via a display of the first endpoint.

Example Dual-SIM and Dual Data Active Device

Figure 6:
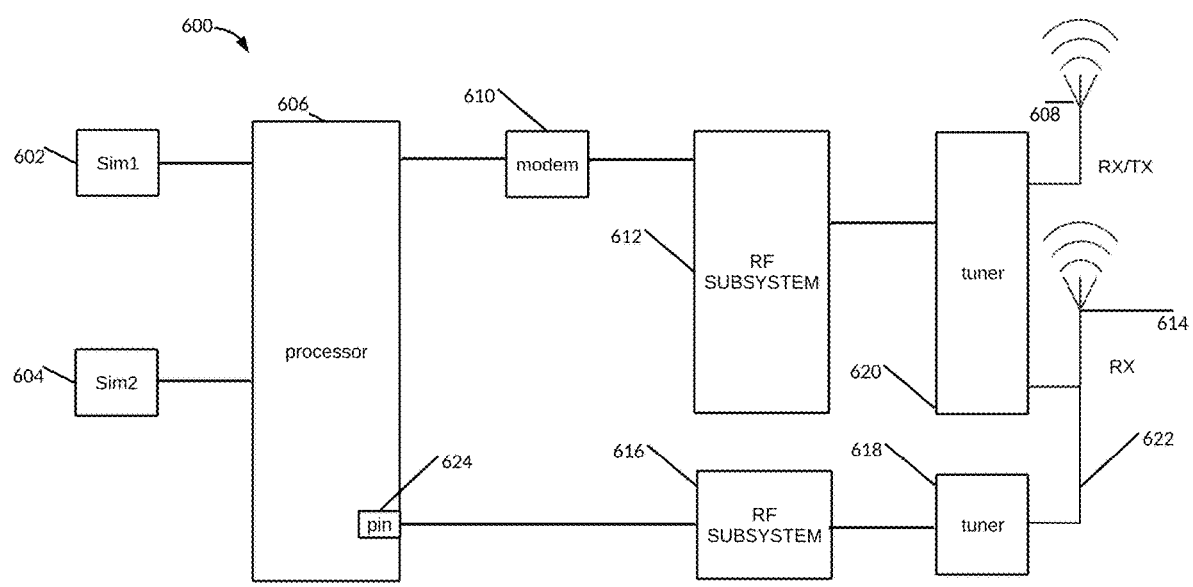
FIG. 6 illustrates a block diagram of an example of a dual-SIM dual-data active wireless device in accordance with certain embodiments of the present disclosure.

FIG. 6 illustrates an example of a portion of a dual-SIM dual-data active wireless device 600 in accordance with certain embodiments. A wireless device may have multiple SIM cards. Such a device may be referred to as a dual-SIM device. As previously discussed, the dual-SIM device can only communicate with a single communication or cellular network at a time using a single SIM card. To communicate using the second SIM card, the wireless device must be reset to switch the active SIM card to the second SIM card.

A dual-SIM dual-data active wireless device enables a wireless device to communicate with multiple cellular networks using multiple SIM cards without needing to reset the wireless device, or network subsystem, which can cause temporary loss of a connection for a period of time, e.g., 20, 30, or 45 seconds. Although the temporary loss of connection may be acceptable when the wireless device is not in use, it can be problematic during a call or when the wireless device is accessing content on a network. A dual-SIM dual-data active wireless device may include a wireless device that can transmit and/or receive data packets on two cellular networks associated with two different SIM cards at the same time, or substantially the same time (e.g., within 1, 2, or 5 microseconds apart, or close enough in time that a user does not experience a loss or reduction in service).

In some embodiments, data packets transmitted over one cellular network may be associated with a first task, and data packets transmitted over another cellular network may be associated with the first task or a second task. For example, the first task may be accessing media at a first network site or from a first media service and the second task may be a voice call with another user or accessing media from another network site or media service. The data packets may be received or transmitted over the two cellular networks simultaneously or sufficiently close enough in time such that a user does not notice an interruption in services or an interruption in the performance of either the first task or the second task. In other words, in certain embodiments, the user may download content from a media site over the first communication network while talking to another user over the second communication network without any interruption in either task.

The wireless device 600 may be, or may mimic, a dual-SIM dual-data active wireless device in that the wireless device 600 can receive communications from multiple cellular networks simultaneously, and can transmit across multiple cellular networks. However, at a particular point in time, the wireless device 600 transmits across one cellular network. The wireless device may switch the active SIM associated with the desired cellular network dynamically and without restarting the wireless device enabling the wireless device 600 to function similarly to a dual-SIM dual data active wireless device.

The wireless device 600 includes a second RF subsystem 616. The second RF subsystem 616 may be configured similarly to, and may perform similar actions as, the RF subsystem 612. However, while the RF subsystem 612 may process signals received on the primary antenna 608, the RF subsystem may process signals received by the diversity antenna 614. Thus, in some cases, the RF subsystem 612 may process signals from a first cellular network associated with the SIM 602 that are received by the primary antenna 608, and the RF subsystem 616 may process signals from a second cellular network associated with the SIM 604 received by the diversity antenna 614. In other cases, the RF subsystem 612 may process signals from the second cellular network associated with the SIM 604 that are received by the primary antenna 608, and the RF subsystem 616 may process signals from the first second cellular network associated with the SIM 602 received by the diversity antenna 614.

As illustrated in FIG. 6, the signal path that includes the RF subsystem 612 includes the modem 610. However, the signal path that includes the RF subsystem 616 omits the modem. Accordingly, in certain embodiments of the wireless device 600, the signal path that includes the RF subsystem 612 may both receive and transmit voice and/or data packets using the primary antenna 608. However, the signal path that includes the RF subsystem 616 may receive signals, but may not transmit signals via the diversity antenna 614. Further, the signals received at the diversity antenna 614 from the second cellular network may be all data packets, which may include voice data packets (e.g., VoLTE), but may omit voice packets. Accordingly, in certain embodiments, the RF subsystem 616 may be a slimmed down version of the RF subsystem 612. For example, while the RF subsystem 612 may include a power amplifier module with one or more power amplifiers for amplifying a signal prior to transmission, the RF subsystem 616 may omit the power amplifier module. The slimmed down RF subsystem 616 may thus be smaller in physical area and may use less power than the RF subsystem 612.

In certain embodiments, the wireless device may include a tuner 618 and a tuner 620. The tuners 618, 620 may include any type of filter that can separate the signals received on the antennas 608, 614. For example, the tuner 618 may include a band-pass filter to pass signals associated with a first cellular network associated with SIM 602 and one or more band-stop filters to remove signals (e.g., noise, undesired harmonics, frequency bands associated with other wireless or cellular networks, and the like) not associated with communication with the first cellular network. Similarly, the tuner 620 may include a band-pass filter to pass signals associated with a second cellular network associated with SIM 604 and one or more band-stop filters to remove signals not associated with communication with the second cellular network. Further, the tuners 618, 620 may convert the received RF signals from the cellular networks into a fixed frequency that facilitates further processing by the RF subsystems 612, 616 and/or the hardware processor 606.

The tuner 620 may further be configured to determine whether a received signal is from a cellular network implementing CDMA, TDMA, GSM, or some other type of communication protocol or standard. In some cases, the determination may be made based on a header that identifies the transmitter of the signal or data packer. In other cases, the determination may be made based on the signal characteristics. Based on the determination of the type of communication protocol, the tuner 620 may cause a modification in the configuration of the RF subsystem 612. Alternatively, or in addition, the RF subsystems 612, 616 may determine the type of cellular network or the communication protocol implemented by the cellular network. In yet other embodiments, the processor 606 may determine the type of cellular network or the communication protocol implemented by the cellular network, and may configure the RF subsystems 612, 616 accordingly.

In certain embodiments, the processor 606 may determine that the second cellular network associated with the SIM 604 is preferable for transmission. For example, the processor 606 may determine that the current signal strength of the second cellular network exceeds, or exceeds by a particular threshold, the current signal strength of the first cellular network. Additionally, or alternatively, the processor 606 may determine that transmission should occur over both the first cellular network and the second cellular network using both SIM 602 and SIM 604, respectively. For example, the processor 606 may determine that the wireless device 600 is attempting to transmit media (e.g., pictures) to a cloud network service (e.g., Dropbox®), and is attempting to establish and maintain a voice call, either using voice-packets or data packets (e.g., Voice over LTE (VoLTE)), or to transmit other data packets using another service (e.g., send email using an email provider). In some such cases, the wireless device 600 may maintain also receive signals associated with the cellular network that is currently transmitting. Thus, in some such cases, either antenna 608, 614, and corresponding signal path, may receive signals from either cellular network associated with the SIMs 602, 604.

As such, in some embodiments, the tuner 618 may further include a band-pass filter to pass signals associated with the second cellular network associated with SIM 604 and one or more band-stop filters to remove signals not associated with communication with the second cellular network. Similarly, the tuner 620 may further include a band-pass filter to pass signals associated with the first cellular network associated with SIM 602 and one or more band-stop filters to remove signals not associated with communication with the first cellular network.

It should be understood that the tuners 618, 620 may include other types of filters and may include other circuitry for performing other functions related with the receipt of one or more signals associated with one or more cellular and/or wireless networks. Further, the tuner 620 may additionally include circuitry for performing functions related to the transmission of signals associated with one or more cellular and/or wireless networks. In certain embodiments, the tuners 618, 620 may be optional or omitted. For example, the functionality of the tuners 618, 620 may be included in the RF subsystems 612, 616, respectively. Further, in certain embodiments, the wireless device 600 may further include one or more additional filters, diplexers, duplexers, or other circuitry for splitting and/or combining signals for communication with the cellular networks.

To enable the additional signal path that includes the RF subsystem to receive signals from one or more of the cellular networks, the diversity antenna 614 may include an additional connection 622. The connection 622 may provide the signal received at the diversity antenna 614 to the tuner 618. Accordingly, the received signal received by the diversity antenna 614 may be provided to both the tuner 620 and the tuner 618. The signal provided by the antenna 614 to the signal path that includes the tuner 620 may be used to measure a signal strength of a cellular network in communication with the wireless device 600. The signal provided by the antenna 614 to the signal path that includes the tuner 618 may be processed to obtain data received over the cellular network in communication with the wireless device 600.

The RF subsystem 616 may be in communication with a port of the processor, such as an auxiliary port. The port may be a pin 624 that is included on the processor 606 that enables an auxiliary device to communicate with the processor 606. Advantageously, in certain embodiments, by connecting the second signal path to another port of the processor 606 (e.g., the pin 624) it is possible to switch the active SIM 602 or 604 without resetting, rebooting, or otherwise losing communication to one of the cellular networks.

In certain embodiments, the auxiliary device is the second RF communication path that permits signals received from a cellular network at the diversity antenna 614 to be provided to the processor 606. The processor 606 can receive data from a second cellular network associated with the second SIM 604 over the diversity antenna 614 via the second RF subsystem 616 connected to the auxiliary port. In some embodiments, the pin 624 is not an auxiliary port but is associated with a particular feature of the processor 606. In some such embodiments, the pin 624 can be repurposed to receive communication signals from a cellular network over the antenna 614 in place of the feature previously associated with the pin 624. Accordingly, in certain embodiments, existing processors 606 can be retrofitted to support multiple cellular networks communicating with the wireless device 600 in concert.

Further, the processor 606 can switch the SIM 602, 604 card that is using the first or primary RF subsystem 612 enabling the wireless device 600 to transmit over either cellular network using the primary, or non-diversity, antenna. The processor 606 may determine the SIM 602, 604 card, or cellular network, to connect to or communicate with using the primary antenna 608 based on a detected signal strength of the two networks. Although the embodiment of FIG. 6 enables the wireless device 600 to receive data from both cellular networks at the same time, transmission may occur over a single cellular network at a particular point in time. Thus, in some cases, the wireless device may not be a bi-directional dual-data dual-active device where both SIMs 602, 604 are simultaneously active for both transmission and reception. However, the processor 606 may rapidly (e.g., within a few microseconds or milliseconds) switch the SIM 602, 604 cards associated with the primary antenna 608 or the SIM 602, 604 that is active a particular point in time. In some such cases, the rapid switching of which SIM 602, 604 is active and/or which SIM 602, 604 is operating over the signal path that includes the antenna 608, may make it undetectable to a user that transmission is occurring via one of the cellular networks and not both cellular networks.

The switching of the active SIM 602, 604, or the SIM that is receiving and transmitting may be determined and/or performed by firmware This firmware may operate at the kernel or operating system level of the processor 606. The firmware may determine the active SIM 602, 604, or the SIM 602, 604 (and associated cellular network) to select for communication based on signal strength for the cellular networks. In addition, or alternatively, the SIM 602, 604 may be selected based on the available bandwidth, the quality of service of the connection, the stability of the connection, a cost associated with the cellular network or any other characteristics associated with the cellular networks or connections therewith.

In certain embodiments, the wireless device 600 may lose connection for a short period of time (e.g., less than 30 seconds, within 5 seconds, within a second, and any value between the foregoing) when switching active SIM cards. In some such embodiments, the wireless device 600 may be configured to not switch active SIMs during an ongoing phone call. Thus, in certain embodiments, a user may not lose voice service during a transition between networks.

Additional Embodiments

All of the processes described herein may be embodied in, and fully automated, via software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence or can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A dynamic routing system comprising:
  a memory configured to store computer-executable instructions, and
  a hardware processor in communication with the memory and configured to execute the specific computer-executable instructions to perform operations comprising:
    receiving, from a first user device, a registration message comprising a plurality of communication paths over which the first user device is accessible, the plurality of communication paths indicating respective IP address/port pairs associated with the first user device, wherein information in the registration message is provided according to a particular control protocol;
    setting a particular communication path as the preferred communication path for the first user device; and
    establishing a connection between the first user device and the second user device according to the particular control protocol, wherein messages are routed to the first user device via the particular communication path,
    and wherein each port indicated by a communication path is configured to be left open, such that the port is configured to transmit and/or receive information.

2. The dynamic routing system of claim 1, wherein each communication path of the plurality of communication paths is associated with a respective communication network, and wherein the particular communication path is set based on determining respective signal strengths associated with the communication networks.

3. The dynamic routing system of claim 1, wherein the first user device identifies the particular communication path as being the preferred communication path.

4. The dynamic routing system of claim 1, wherein the operations further comprise:
  receiving, from the first user device, a switch message indicating that the first user device is not accessible via the particular communication path; and
  routing the messages to the first user device over a different communication path of the plurality of communication paths, such that the established connection is maintained.

5. The dynamic routing system of claim 4, wherein the switch message is received via the different communication path.

6. The dynamic routing system of claim 1, wherein the particular control protocol is the session initiation protocol (SIP), wherein the messages are SIP messages and the connection is a SIP connection, and wherein the operations further comprise:

receiving, from the first user device, a switch message indicating that the first user device is to lose access to the particular communication path; and routing SIP messages to the first user device over a different communication path of the plurality of communication paths, such that the SIP connection is maintained.

7. The dynamic routing system of claim 6, wherein the switch message is received via the particular communication path or the different communication path.

8. The dynamic routing system of claim 6, wherein each communication path is associated with a respective communication network, and wherein the first user device is determined to be navigating to a location at which a communication network associated with the particular communication path is below a threshold.

9. The dynamic routing system of claim 1, wherein the dynamic routing system is configured to assign a respective port of the dynamic routing system to each of the plurality of communication paths.

10. A dynamic routing system comprising:
a memory configured to store computer-executable instructions, and
a hardware processor in communication with the memory and configured to execute the specific computer-executable instructions to perform operations comprising:
receiving, from a first user device, a registration message comprising a plurality of communication paths over which the first user device is accessible, the plurality of communication paths indicating respective IP address/port pairs associated with the first user device, wherein information in the registration message is provided according to a particular control protocol, and wherein the registration message includes a first media channel and a second media channel, and wherein the second media channel includes information indicative of a subset of the plurality of communication paths;
setting a particular communication path as the preferred communication path for the first user device; and
establishing a connection between the first user device and the second user device according to the particular control protocol, wherein messages are routed to the first user device via the particular communication path.

11. The dynamic routing system of claim 10, wherein the first media channel is configured to include a media stream payload.

12. A dynamic routing system comprising:
a memory configured to store computer-executable instructions, and
a hardware processor in communication with the memory and configured to execute the specific computer-executable instructions to perform operations comprising:
receiving, from a first user device, a registration message comprising a plurality of communication paths over which the first user device is accessible, the plurality of communication paths indicating respective IP address/port pairs associated with the first user device, wherein information in the registration message is provided according to a particular control protocol;
setting a particular communication path as the preferred communication path for the first user device; and
establishing a connection between the first user device and the second user device according to the particular control protocol, wherein messages are routed to the first user device via the particular communication path, wherein the particular control protocol is the session initiation protocol (SIP), and wherein the registration message includes a header associated with identifying information according to SIP, wherein information indicative of a first communication path of the plurality of communication paths is associated with the header, and wherein information indicative of remaining of the communication paths is appended to the registration message.

13. A method implemented by a dynamic routing system of one or more computers, wherein the method comprises:
receiving, from a first user device, a registration message comprising a plurality of communication paths over which the first user device is accessible, the plurality of communication paths indicating respective IP address/port pairs associated with the first user device, wherein information in the registration message is provided according to a particular control protocol;
setting a particular communication path as the preferred communication path for the first user device; and
establishing a connection between the first user device and the second user device according to the particular control protocol, wherein messages are routed to the first user device via the particular communication path, and wherein each port indicated by a communication path is configured to be left open, such that the port is configured to transmit and/or receive information.

14. The method of claim 13, wherein each communication path of the plurality of communication paths is associated with a respective communication network, and wherein the particular communication path is set based on determining respective signal strengths associated with the communication networks.

15. The method of claim 13, further comprising:
receiving, from the first user device, a switch message indicating that the first user device is to lose access to the particular communication path; and
routing the messages to the first user device over a different communication path of the plurality of communication paths, such that the established connection is maintained.

16. A method of claim 13, implemented by a dynamic routing system of one or more computers, wherein the method comprises:
receiving, from a first user device, a registration message comprising a plurality of communication paths over which the first user device is accessible, the plurality of communication paths indicating respective IP address/port pairs associated with the first user device, wherein information in the registration message is provided according to a particular control protocol, and wherein the registration message includes a first media channel and a second media channel, and wherein the second media channel includes information indicative of a subset of the plurality of communication paths;
setting a particular communication path as the preferred communication path for the first user device; and
establishing a connection between the first user device and the second user device according to the particular control protocol, wherein messages are routed to the first user device via the particular communication path.

17. The method of claim 16, wherein the first media channel is configured to include a media stream payload.

18. A method implemented by a dynamic routing system of one or more computers, wherein the method comprises:
receiving, from a first user device, a registration message comprising a plurality of communication paths over which the first user device is accessible, the plurality of communication paths indicating respective IP address/port pairs associated with the first user device, wherein information in the registration message is provided according to a particular control protocol;

setting a particular communication path as the preferred communication path for the first user device; and establishing a connection between the first user device and the second user device according to the particular control protocol, wherein messages are routed to the first user device via the particular communication path, wherein the particular control protocol is the session initiation protocol (SIP), and wherein the registration message includes a header associated with identifying information according to SIP, wherein information indicative of a first communication path of the plurality of communication paths is associated with the header, and wherein information indicative of remaining of the communication paths is appended to the registration message.

19. Non-transitory computer storage media storing instructions that when executed by a system of one or more processors, cause the one or more processors to perform operations comprising:

receiving, from a first user device, a registration message comprising a plurality of communication paths over which the first user device is accessible, the plurality of communication paths indicating respective IP address/port pairs associated with the first user device, wherein information in the registration message is provided according to a particular control protocol;

setting a particular communication path as the preferred communication path for the first user device; and establishing a connection between the first user device and the second user device according to the particular control protocol, wherein messages are routed to the first user device via the particular communication path, and wherein each port indicated by a communication path is configured to be left open, such that the port is configured to transmit and/or receive information.

* * * * *